United States Patent
Zak et al.

(10) Patent No.: US 11,570,425 B2
(45) Date of Patent: Jan. 31, 2023

(54) VANISHING POINT STEREOSCOPIC IMAGE CORRECTION

(71) Applicant: SNAP INC., Santa Monica, CA (US)

(72) Inventors: Eyal Zak, Megiddo (IL); Sagi Katz, Yokneam Illit (IL)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/887,052

(22) Filed: May 29, 2020

(65) Prior Publication Data

US 2020/0413030 A1 Dec. 31, 2020

Related U.S. Application Data

(60) Provisional application No. 62/866,050, filed on Jun. 25, 2019.

(51) Int. Cl.
| | |
|---|---|
| H04N 13/327 | (2018.01) |
| H04N 13/344 | (2018.01) |
| G06T 15/20 | (2011.01) |
| G06T 7/80 | (2017.01) |

(52) U.S. Cl.
CPC .......... H04N 13/327 (2018.05); G06T 7/85 (2017.01); G06T 15/20 (2013.01); H04N 13/344 (2018.05)

(58) Field of Classification Search
None
See application file for complete search history.

(56) References Cited

U.S. PATENT DOCUMENTS

| | | | |
|---|---|---|---|
| 9,161,027 B2 | 10/2015 | Lee et al. | |
| 10,178,378 B2* | 1/2019 | Travis | H04N 13/344 |
| 10,452,075 B2 | 10/2019 | Jang | |
| 10,558,867 B2 | 2/2020 | Ohara et al. | |
| 2001/0035934 A1* | 11/2001 | Jagasia | G02C 9/00 351/133 |
| 2008/0013789 A1* | 1/2008 | Shima | G06V 20/588 382/104 |
| 2009/0088978 A1* | 4/2009 | Ishikawa | G08G 1/096725 701/514 |

(Continued)

FOREIGN PATENT DOCUMENTS

| | | |
|---|---|---|
| JP | 2018090239 A | 6/2018 |
| KR | 1020090108822 A | 10/2009 |

(Continued)

OTHER PUBLICATIONS

International Search Report and Written Opinion for International Application No. PCT/US2020/035076, dated Sep. 11, 2020 (dated Sep. 11, 2020)—10 pages.

*Primary Examiner* — Stuart D Bennett
(74) *Attorney, Agent, or Firm* — Culhane Meadows PLLC; Stephen J. Weed

(57) ABSTRACT

Three-dimensional image calibration and presentation for stereoscopic imaging systems such as eyewear including a first camera and a second camera is described. The calibration and presentation includes obtaining a calibration offset using vanishing points obtained from images captured by a first camera and a second camera to accommodate rotation of the first and second cameras with respect to one another, adjusting a three-dimensional rendering offset by the obtained calibration offset, and presenting the stereoscopic images using the three dimension rendering offset.

17 Claims, 9 Drawing Sheets

(56) References Cited

U.S. PATENT DOCUMENTS

| | | | |
|---|---|---|---|
| 2009/0179916 A1* | 7/2009 | Williams | G06T 7/80 |
| | | | 345/629 |
| 2011/0311130 A1* | 12/2011 | Ichimori | G06T 7/70 |
| | | | 382/154 |
| 2012/0215377 A1* | 8/2012 | Takemura | B60W 30/12 |
| | | | 701/1 |
| 2015/0371094 A1* | 12/2015 | Gardiner | G01S 19/13 |
| | | | 348/148 |
| 2015/0379359 A1* | 12/2015 | Han | B60R 1/00 |
| | | | 348/148 |
| 2017/0061622 A1 | 3/2017 | Sakano et al. | |
| 2018/0285660 A1* | 10/2018 | Ohara | B60R 11/04 |

FOREIGN PATENT DOCUMENTS

| | | |
|---|---|---|
| KR | 1020140054590 A | 5/2014 |
| WO | 2017056484 A1 | 4/2017 |

\* cited by examiner

VANISHING POINT STEREOSCOPIC IMAGE CORRECTION

CROSS-REFERENCE TO RELATED APPLICATIONS

This application claims priority to U.S. Provisional Application Ser. No. 62/866,050 entitled VANISHING POINT STEREOSCOPIC IMAGE CORRECTION, filed on Jun. 25, 2019, the contents of which are incorporated fully herein by reference.

TECHNICAL FIELD

The present subject matter relates to stereoscopic image capture in, for example, eyewear, e.g., smart glasses, and, more particularly, to stereoscopic image capture using dual cameras.

BACKGROUND

Stereoscopic images of a scene are useful to create a three-dimensional effect. Typically, a first camera captures a first image of the scene and a second camera captures a second image of the same scene. The first and second cameras have a fixed relationship to one another. A three-dimensional display system presents the captured first image to an eye of an observer and the captured second image to the other eye of the observer to create the desired three-dimensional effect.

BRIEF DESCRIPTION OF THE DRAWINGS

The drawings depict implementations, by way of example only, not by way of limitations. In the figures, like reference numerals refer to the same or similar elements. When a plurality of similar elements are present, a single reference numeral may be assigned to the plurality of similar elements with a small letter designation referring to specific elements. When referring to the elements collectively or to a non-specific one or more of the elements, the small letter designation may be dropped.

FIG. 3A is an illustration of a VP for the image of the cube obtained with a second camera.

DETAILED DESCRIPTION

Figure 1:
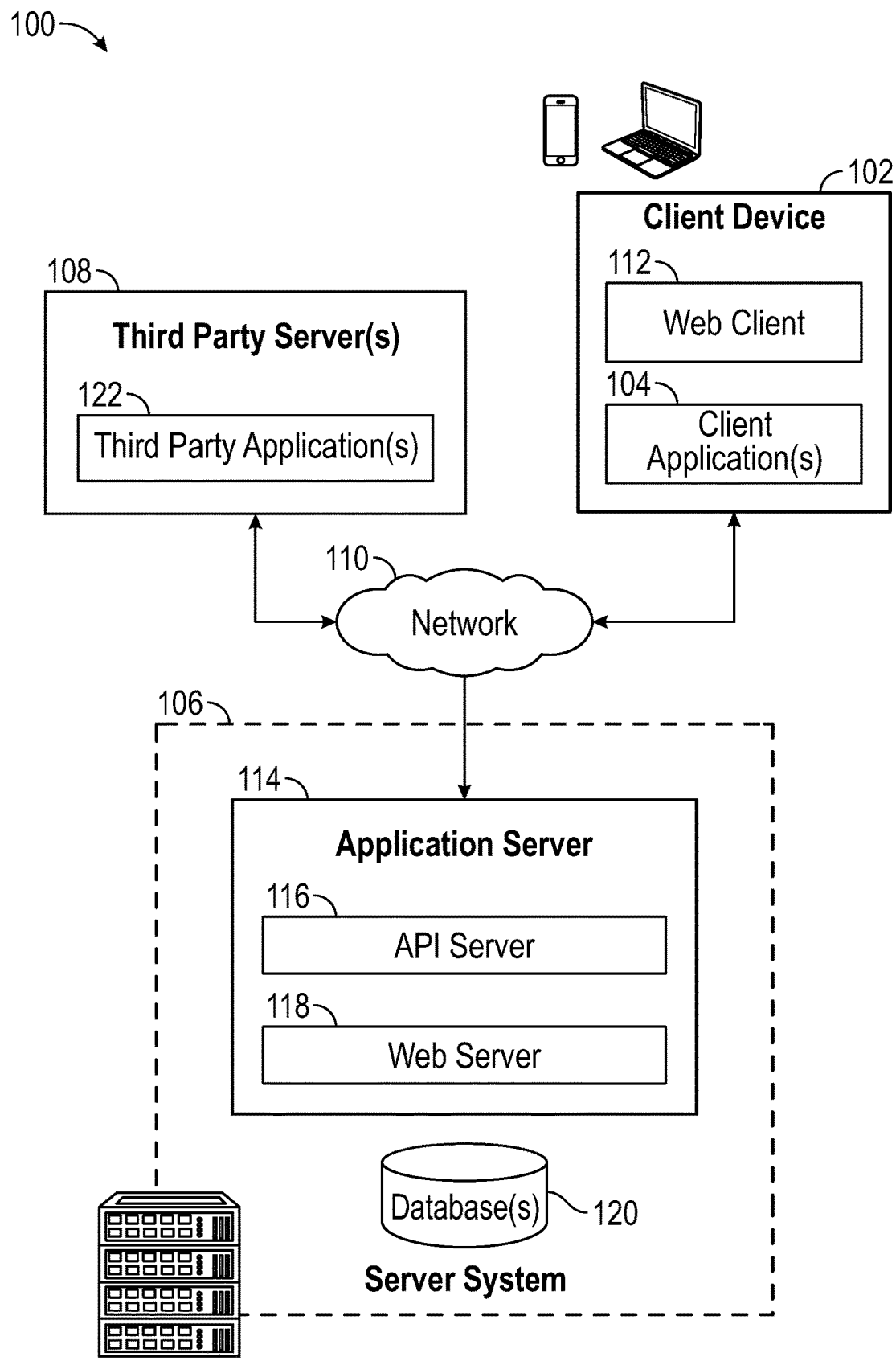
FIG. 1 is a block diagram illustrating a system configured to obtain, process, and present images.

Stereo cameras include a pair of cameras, e.g., a first camera to capture an image of a scene from the perspective of a left eye and a second camera to capture an image of the scene from the perspective a right eye. The relationship between the first and second cameras is important in order to provide a realistic three-dimensional effect. If the relationship between the first and second cameras deviates from a fixed relationship, e.g., due to bending of the support structure on which the cameras are mounted, the three-dimensional experience may be adversely affected.

Three-dimensional image calibration and presentation for eyewear including a first camera and a second camera is described. The calibration and presentation includes obtaining a calibration offset using vanishing points obtained from images captured by a first camera and a second camera to accommodate rotation of the first and second cameras with respect to one another, adjusting a three-dimensional rendering offset by the obtained calibration offset, and presenting the stereoscopic images using the adjusted three dimension rendering offset.

In the following detailed description, numerous specific details are set forth by way of examples in order to provide a thorough understanding of the relevant teachings. However, it should be apparent to those skilled in the art that such details are not necessary to practice the present teachings. In other instances, a relatively high-level description, without detail, of well-known methods, procedures, components, and circuitry avoids unnecessarily obscuring aspects of the present teachings.

The term "coupled" as used herein refers to any logical, optical, physical or electrical connection, link or the like by which signals or light produced or supplied by one system element are imparted to another coupled element. Unless described otherwise, coupled elements or devices are not necessarily physically connected to one another and may be separated by airspace, intermediate components, elements or communication media that may modify, manipulate or carry the light or signals.

The orientations of the eyewear depicted and described here, and associated components, are by way of example only, for illustration and discussion purposes. In operation, orientation of the eyewear may be in other directions suitable to the particular application of the eyewear, for example up, down, sideways, or any other orientation. Also, any directional term, such as front, rear, inwards, outwards, towards, left, right, lateral, longitudinal, up, down, upper, lower, top, bottom and side, is exemplary, and not limiting, as to direction or orientation.

Example image capture eyewear has an optical element, electronic components, a support structure configured to support the optical element and the electronic components including dual cameras, and a display system coupled to the electronic components and supported by the support structure. The dual cameras capture stereoscopic images for use in rendering three-dimensional images and/or creating a three-dimensional effect.

FIG. 1 is a block diagram illustrating a system 100, according to some examples, configured to obtain, process, and present three-dimensional images and effects. The system 100 includes one or more client devices such as client device 102. The client device 102 includes, but is not limited to eyewear, a mobile phone, desktop computer, laptop, portable digital assistants (PDA), smart phone, tablet, ultrabook, netbook, laptop, multi-processor system, microprocessor-based or programmable consumer electronic, game console, set-top box, computer in a vehicle, or any other communication device that a user may utilize to access the system 100. In some examples, the client device 102 includes a display module (not shown) to display information (e.g., in the form of user interfaces). In further examples, the client device 102 includes one or more of touch screens, accelerometers, gyroscopes, cameras, microphones, global positioning system (GPS) devices, and so forth. The client device 102 may be a device of a user that is used to access and utilize an online social platform.

For example, client device 102 is a device of a given user who uses an application 104 on an online social platform, a gaming platform, and communication applications. Client device 102 accesses a website, such as an online social platform hosted by a server system 106. The user inputs login credentials associated with the user. Server system 106 receives the request and provides access to the online social platform.

A user of the client device 102 launches and engages an application 104 hosted by the server system 106. One or more users may be a person, a machine, or other means of interacting with the client device 102. In examples, the user may not be part of the system 100 but may interact with the system 100 via the client device 102 or other means. For instance, the user may provide input (e.g., touch screen input or alphanumeric input) to the client device 102 and the input may be communicated to other entities in the system 100 (e.g., third-party servers 108, server system 106, etc.) via the network 110. In this instance, the other entities in the system 100, in response to receiving the input from the user, may communicate information to the client device 102 via a network 110 to be presented to the user. In this way, the user interacts with the various entities in the system 100 using the client device 102.

One or more portions of the network 110 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a 4G LTE network, another type of network, or a combination of two or more such networks.

The client device 102 may access the various data and applications provided by other entities in the system 100 via a web client 112 (e.g., a browser) or one or more client applications 104. The client device 102 may include one or more client application(s) 104 (also referred to as "apps") such as, but not limited to, a web browser, messaging application, multi-player gaming application, electronic mail (email) application, an e-commerce site application, a mapping or location application, an online home buying and selling application, a real estate application, and the like.

In some examples, one or more client application(s) 104 are included in a given one of the client device 102, and configured to locally provide the user interface and at least some of the functionalities, with the client application(s) 104 configured to communicate with other entities in the system 100 (e.g., third-party server(s) 108, server system 106, etc.), on an as-needed basis, for data processing capabilities not locally available (e.g., to access location information, to authenticate a user, etc.). Conversely, one or more client application(s) 104 may not be included in the client device 102, and then the client device 102 may use its web browser to access the one or more applications hosted on other entities in the system 100 (e.g., third-party server(s) 128, server system 106, etc.).

The server system 106 provides server-side functionality via the network 110 (e.g., the Internet or wide area network (WAN)) to: one or more third party server(s) 108, and one or more client devices 102. The server system 106 includes an application server 114 including an application program interface (API) server 116 and a web server 118 that may be communicatively coupled with one or more database(s) 120. The one or more database(s) 120 may be storage devices that store data related to users of the server system 106, applications associated with the server system 106, cloud services, housing market data, and so forth. The one or more database(s) 120 may further store information related to third-party server(s) 108, third-party application(s) 122, client device 102, client application(s) 104, users, and so forth. In one example, the one or more database(s) 120 may be cloud-based storage.

The server system 106 may be a cloud computing environment, according to some examples. The server system 106, and any servers associated with the server system 106, may be associated with a cloud-based application, in one example.

The one or more third-party server(s) 108 may include one or more third party application(s) 122. The one or more third party application(s) 122, executing on third party server(s) 108 may interact with the server system 106 via API server 116 via a programmatic interface provided by the API server 116. For example, one or more of the third-party applications 122 may request and utilize information from the server system 106 via the API server 116 to support one or more features or functions on a website hosted by the third party or an application hosted by the third party. The third-party application(s) 122, for example, may provide software version analysis functionality that is supported by relevant functionality and data in the server system 106.

Figure 2A:
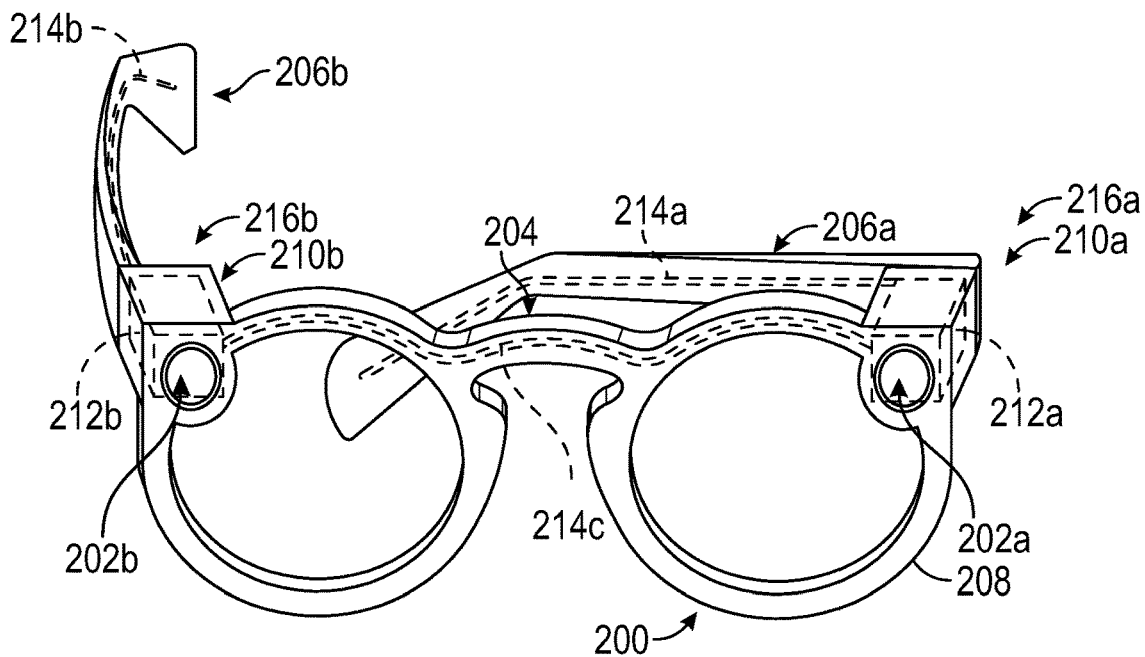
FIG. 2A is a perspective view of an image capture eyewear example including dual cameras and a support structure supporting the dual cameras and other electronic components.

FIG. 2A depicts a front perspective view of an example client device in the form of eyewear 200. The eyewear 200 includes a first camera 202a and a second camera 202b. The illustrated image capture eyewear 200 includes a support structure 204 that has temples 206a and 206b extending from a central frame portion 208. Image capture eyewear 200 additionally includes articulated joints 210a and 210b, electronic components 212b and 212a, and core wires 214a, 214b and 214c for rigidity. Although the illustrated image capture eyewear 200 are glasses, the image capture eyewear may take other forms such as a headset, head gear, helmet, or other device that may be worn by the user. Furthermore, although examples are provided herein for eyewear, these examples may be applied and extended to essentially any stereoscopic system.

Support structure 204 supports the cameras 202. Support structure 204 also supports one or more optical elements within a field of view of a user when worn by the user. For example, central frame portion 208 supports the one or more optical elements. As used herein, the term "optical elements" refers to lenses, transparent pieces of glass or plastic, projectors, screens, displays and other devices for presenting visual images or through which a user perceives visual images. In an example, respective temples 206a and 206b connect to central frame portion 208 at respective articulated joints 210a and 210b. The illustrated temples 206a and 206b are elongate members having respective core wires 214a and 214b extending longitudinally therein for rigidity.

Temple 206b is illustrated in a wearable condition and temple 206a is illustrated in a collapsed condition in FIG. 2A. As shown in FIG. 2A, articulated joint 210a connects temple 206a to a left end portion 216a of central frame portion 208. Similarly, articulated joint 210b connects temple 206b to a right end portion 216b of central frame portion 208. The left end portion 216a of central frame portion 208 includes a housing that carries electronic components 212a therein. The right end portion 216b also includes a housing that carries electronic components 212b therein. The housings may be integrally formed with the central frame 208, integrally formed with the respective temples 206, or formed as separate components.

A plastics material or other material embeds core wire 214a, which extends longitudinally from adjacent articulated joint 210a toward a longitudinal end of temple 206a. Similarly, the plastics material or other material also embeds core wire 214b, which extends longitudinally from adjacent articulated joint 210b toward a longitudinal end of temple 206b. The plastics material or other material additionally embeds core wire 214c, which extends from the left end portion 216a (terminating adjacent electronic components 212a) to right end portion 216b (terminating adjacent electronic components 212b).

Electronic components 212a and 212b are carried by support structure 204 (e.g., by either or both of temple(s) 206 and/or central frame portion 208). Electronic components 212a and 212b include a power source, power and communication related circuitry, communication devices, display devices, a computer, a memory, modules, and/or the like (not shown). Electronic components 212a and 212b may also include or support the first camera 202a and/or the second camera 202b for capturing images and/or videos from different perspectives. These images may be fused to generate a stereoscopic images/videos.

In one example, temples 206a and 206b and central frame portion 208 are constructed of a plastics material, cellulosic plastic (e.g., cellulosic acetate), an eco-plastic material, a thermoplastic material, or the like, with core wires 214 embedded therein. Core wires 214 provide structural integrity to support structure 204 (i.e., temple(s) 206 and/or central frame portion 208). Additionally, core wires 214 act as a heat sink to transfer heat generated by electronic components 212a and 212b away therefrom so as to reduce the likelihood of localized heating adjacent electronic components 212a and 212b. As such, core wires 214 thermally couple to the heat source to provide a heat sink for the heat source. Core wires 214 may include relatively flexible conductive metal or metal alloy material such as one or more of an aluminum, an alloy of aluminum, alloys of nickel-silver, and a stainless steel, for example.

Figure 2B:
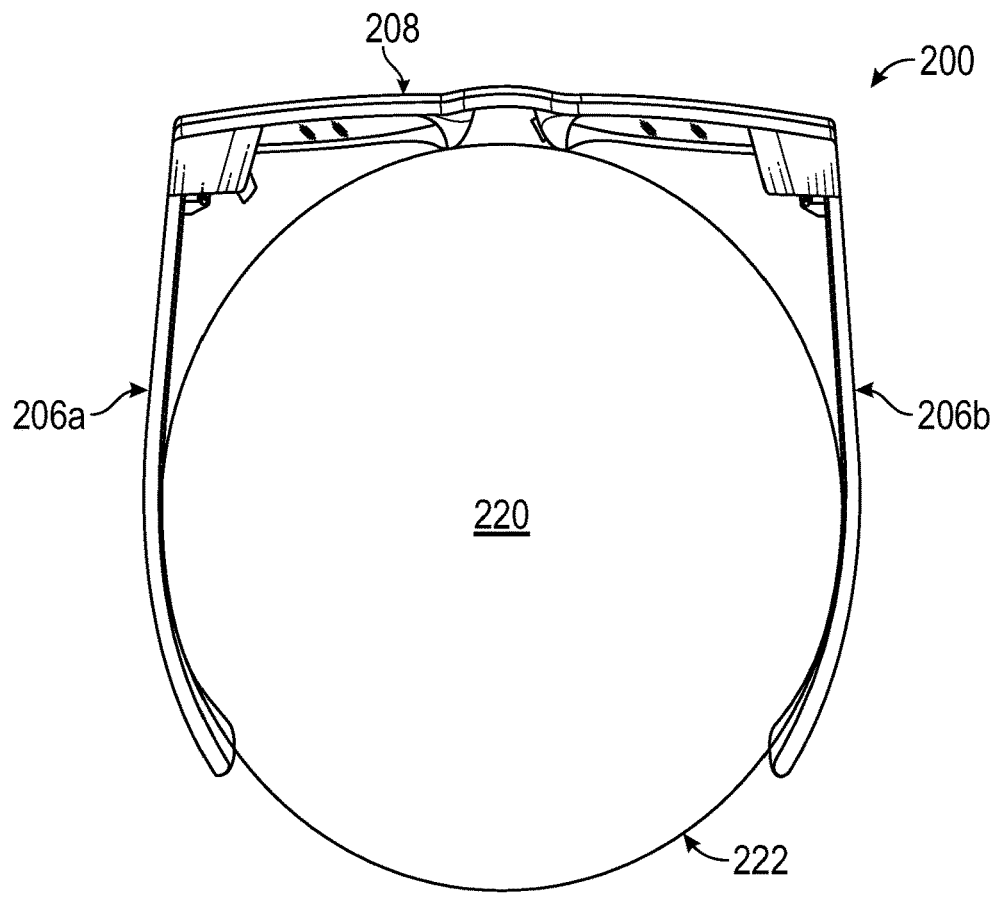
FIG. 2B is a top view of the image capture eyewear example of FIG. 2A illustrating a region defined by the image capture eyewear for receiving a head of a user wearing the image capture eyewear.

As illustrated in FIG. 2B, support structure 204 defines a region (e.g., region 220 defined by the frame 208 and temples 206) for receiving a portion 222 (e.g., the main portion) of the head of the user/wearer. The defined region(s) are one or more regions containing at least a portion of the head of a user that are encompassed by, surrounded by, adjacent, and/or near the support structure when the user is wearing the image capture eyewear 200.

Figure 2C:
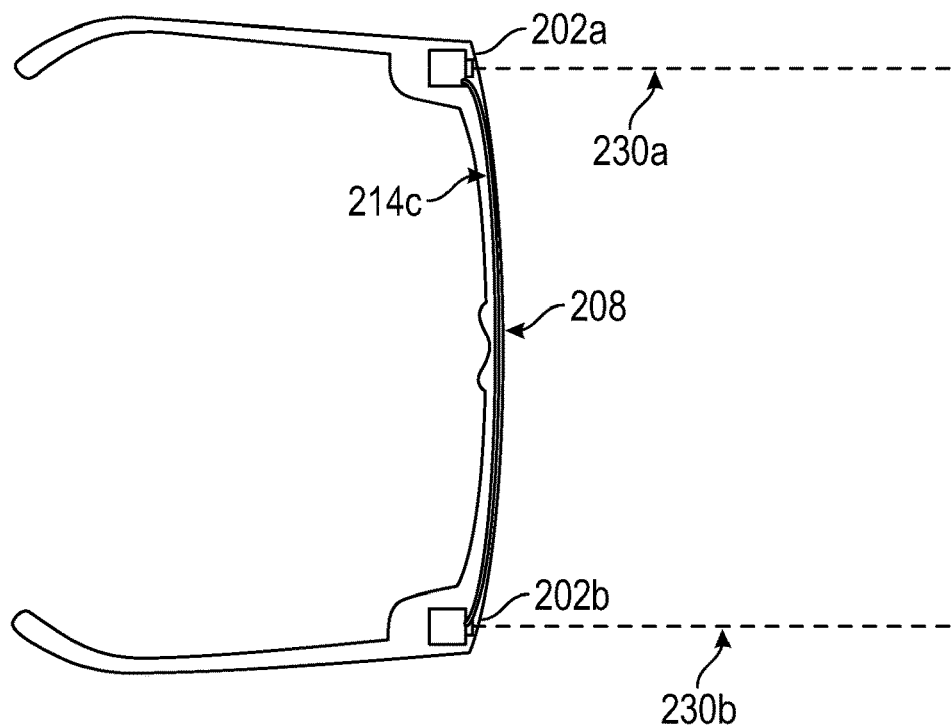
FIG. 2C is a top-side view of the image capture eyewear example of FIG. 2A showing the locations of the dual cameras and the flexibility of the eyewear.

As described above, image capture eyewear 200 has dual cameras 202 for capturing stereoscopic images. A simplified overhead view of the dual cameras 202 is shown in FIG. 2C, where frame 208 includes cameras 202 integrated into respective, opposite sides (i.e., left and right sides) of frame 208. The first camera 202a has a first sight line 230a and the second camera 202b has a second sight line 230b. In an example, absent flexing of the frame 208, the first and second sight lines 230 are substantially parallel. Generally, stereoscopic imaging is a technique for generating what appears to be a three-dimensional (3D) image having depth from two or more offset two-dimensional (2D) images. Stereoscopic imaging is performed naturally by humans whom capture offset images with their respective left and right eyes. These offset images are then combined by the brain to form what appears to be a 3D image (i.e. an image with depth).

Generation of three-dimensional images and/or creation of a three-dimensional effect generally requires the fusion of stereoscopic images. For example, a stereoscopic imaging algorithm may create a three-dimensional image by fusing the stereoscopic images using the known sight lines, separation of the sight lines, and/or fields of view of the cameras. A stereoscopic imaging algorithm may create a three-dimensional effect by presenting a first of the stereoscopic images to a first eye of an observer via a display and a second of the stereoscopic images to a second eye of the observer via the same or a different display using the known sight lines, separation of the sight lines, and/or fields of view of the cameras.

The stereoscopic imaging algorithm can extract depth information by comparing information about a scene from the stereoscopic images, e.g., by examining the relative positions of objects in the two images. In traditional stereo vision, two cameras, displaced horizontally from one another are used to obtain two differing views on a scene. By comparing these two images, the relative depth information can be obtained in the form of a disparity map, which encodes the difference in horizontal coordinates of corresponding image points. The values in this disparity map are inversely proportional to the scene depth at the corresponding pixel location.

For a human to experience a three-dimensional effect, a stereoscopic device may superimpose the stereoscopic images, with the image from the right camera 202b being shown to the observer's right eye and from the left camera 202a being shown to the left eye. The images may be pre-processed to increase picture quality. For example, the images may first be processed to remove distortion (e.g., due to having been acquired with a "fisheye" lens). For example, barrel distortion and tangential distortion may be removed to ensure the observed image matches the projection of an ideal pinhole camera. The image may additionally be projected back to a common plane to allow comparison of the image pairs, known as image rectification. This gives the best estimate of the position of features in the two images, and creates a disparity map. Optionally, the received disparity map is projected into a three-dimensional point cloud. By utilizing the cameras' projecting parameters, the point cloud can be computed such that it provides measurements at a known scale.

The algorithm(s) for presenting the stereoscopic images to produce a three-dimensional effect is dependent on the relative sightlines/fields of views between the respective cameras. Without this information, the algorithm(s) may not be able to properly fuse/display the stereoscopic images to achieve the desired three-dimensional effect.

Eyewear have a stiffness that enables support of the eyewear components, while allowing for some flexibility for user comfort. This flexibility, however, complicates the capture of suitable stereoscopic images to produce a desired three-dimensional effect, which, as described above, require the cameras to have a known sight lines/fields of view with respect to one another.

Figure 2D:
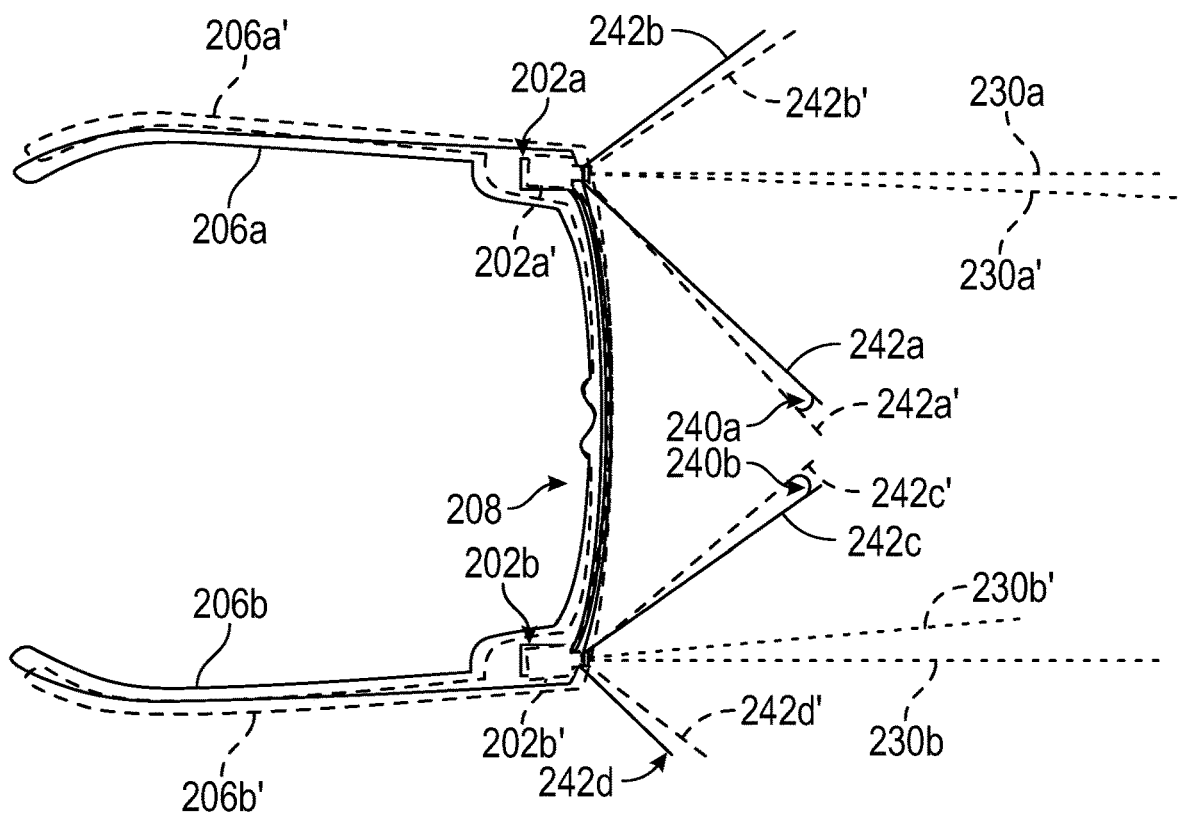
FIG. 2D is another top-side view of the image capture eyewear example of FIG. 2A showing the respective fields of view of the dual cameras at different flex positions.

For example, the stereoscopic imaging algorithm may be set based on the known fields of view of the cameras as shown FIG. 2C, which have sight lines 230 that are substantially parallel to each other. As illustrated in FIG. 2D, however, when the user places eyewear 200 on their head, frame 208 may flex due to temples 206a and 206b bowing outward to bowed temple positions 206a' and 206b', resulting in a change in the orientation of the cameras 202. When the orientation of the cameras 202 change, the original sight lines 230a and 230b of cameras 202a and 202b shift by a respective variable angle 240a and 240b to flexed sight lines 230a', 230b'. Thus, the sight lines 230a' and 230b' of cameras 202a and 202b would no longer be parallel to each other.

The variable angles 240a and 240b resulting from this flexing are dependent on the stiffness of the temples 206, the stiffness of the frame 208, the size of the user's head, etc. Thus, the relative fields of view of cameras 202 may be different for different wearers. The unflexed field of view of camera 202a changes by angle 240a from a field of view represented by lines 242a to 242b to a field of view represented by 242a' to 242b'. The unflexed field of view of camera 202b changes by angle 240b from a field of view represented by lines 242C to 242D to a field of view represented by 242C' to 242D'. In an example, a stereoscopic image algorithm calibrates the cameras to determine their relative fields of view.

Only two flexure states are illustrated in FIG. 2D, however, flexure may occur along and/or around essentially any axis extending through the eyewear 200. The range of flexure may have a minimum and a maximum that is dependent on the structural stiffness of frames 208. In general, as the frame stiffness increases and/or the temple stiffness decreases, the range of flexure decreases. Therefore, the eyewear may be designed and manufactured with a predetermined stiffness that limits the flexure range to an acceptable level along all axis and angles of flexure. The stiffness may be designed based on the materials used to construct the frame. For example, a crossbar (e.g. metal) may be integrated in the frames along line 214c to limit the flexure of the frames and thus limit the movement of the sight lines/fields of view of cameras 202 to a predetermined range acceptable for producing the stereoscopic image.

Generally, the eyewear 200 performs a calibration prior to generating stereoscopic images. The calibration algorithm includes capturing images from both cameras 202 and determining the relative fields of view between the cameras by matching features between corresponding images captured by each of the cameras (i.e., what is the relative movement of a feature between left camera 202a and right camera 202b. This calibration may be performed automatically by the eyewear, or upon user request (e.g. the user pressing a button (not shown). Once calibration is performed, the eyewear may capture stereoscopic images for use in producing three-dimensional images and/or producing three-dimensional effects by taking into account changes to the sight lines/fields of view.

Figure 3A:
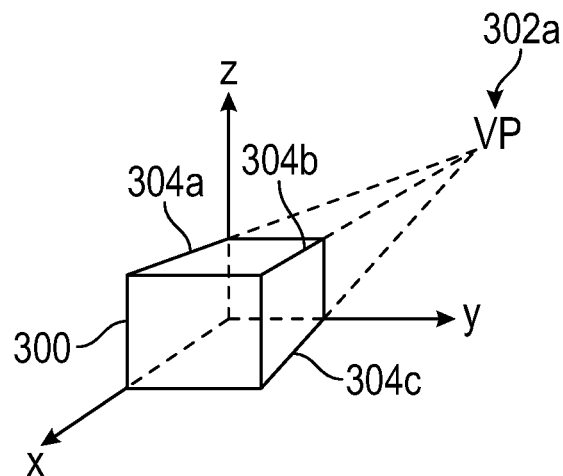
FIG. 3A is an illustration of a vanishing point (VP) for an image of a cube obtained with a first camera.
Figure 3B:
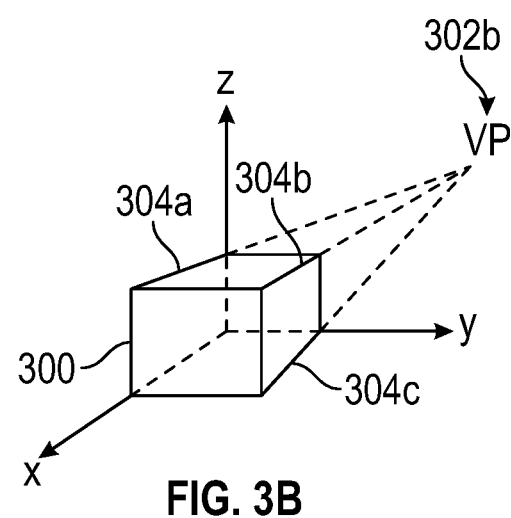
FIG. 3C is an illustration of a VP for an image of a scene obtained with a camera.

FIG. 3A illustrates an image of a cube 300 in an x, y, x coordinate space captured/obtained by a first camera 202a (FIG. 2C) and FIG. 3B illustrates an image of the cube 300 in the x, y, z coordinate space captured/obtained by a second camera 202b. Extending parallel linear features of the cube 300 results in those features converging at a vanishing point 302a in FIG. 3A and vanishing point 302b in FIG. 3B. The difference in position of VP 302a and 302 b is due to offset and rotation differences between the first and second cameras 202.

The cube 300 has three linear edges (edge 304a, edge 304b, and edge 304c) that are known to be linear and parallel. Extending the parallel linear features converges at the vanishing point 302.

Figure 3C:
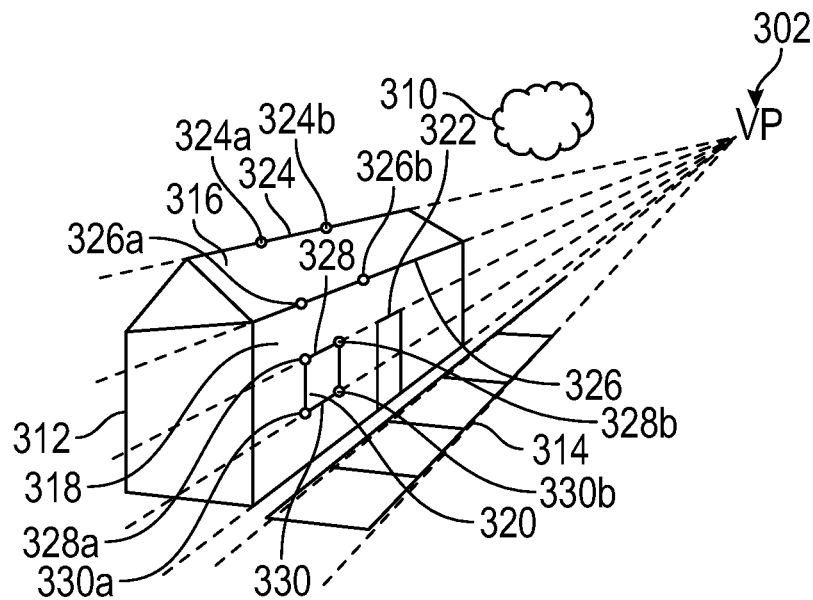

FIG. 3C illustrates an image of a scene captured/obtained by a camera 202. In order to determine rotational differences between images of the same scene captured by two different cameras it is useful to identify a common feature between the images obtained at an infinity focal length. For example, a cloud 310 may be identified in a background as having an infinity focal length since cloud are known to be present in images at an infinity focal length. However, clouds are not always present (e.g., for images taken indoors, on sunny days, and at angles where the sky is not visible). In this situation, the inventors discovered that vanishing points obtained by extending known parallel features are useful, for example, in determining rotational differences in cameras capturing the same scene.

FIG. 3C depicts a structure 312 including many objects with known parallel features. Additionally, FIG. 3C depicts a path 314 in front of the structure 312 also having known parallel features. The structure 312 includes a roof 316, a side 318, a window 320, and a door 322, which each have features with a known parallel relationship. The roof 316, for example, has an apex 324 and a bottom edge 326. Selecting a first point 324a and a second point 324b on the apex 324 and a first point 326a and a second point 326b on the bottom edge 326, and extending lines between the selected points, converge at the vanishing point 302. Likewise, the window 320 has a top edge 3228 and a bottom edge 330. Selecting a first point 328a and a second point 328b on the top edge 328 and a first point 330a and a second point 330b on the bottom edge 330, and extending lines between the selected points, converge at the vanishing point 302. Other examples of objects with known parallel features will be readily apparent to one of skill in the art from the description herein.

Figure 4:
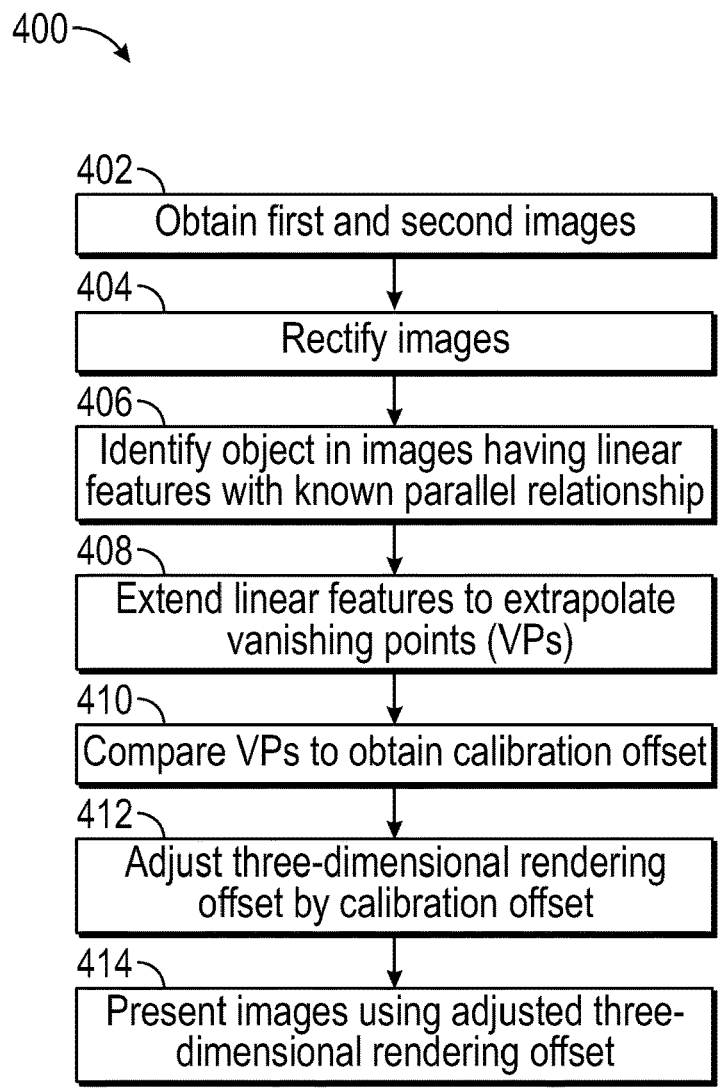
FIG. 4 is a flowchart of an example method for obtaining, processing, and presenting three-dimensional images.

FIG. 4 depicts a flowchart 400 of an example method for obtaining, processing, and presenting three-dimensional images. The steps of flow chart 400 are depicted and described as being performed in a sequential order, however, in some examples, one or more steps may be performed simultaneously or in a different order. Additionally, one or more steps may be omitted in other examples.

At step 402, obtain first and second images of a scene. The eyewear 200 captures stereoscopic images of a scene. Eyewear 200 may capture a left raw image of the scene with the left camera 202a and a right raw image of the scene with a right camera 202a. In an example, the scene contains at least one object having known parallel features that are detectable by an image processing algorithm such as Scale Invariant Feature Transforms (SIFT) or Binary Robust Invariant Scalable Keypoints (BRISK). In another example, a trained deep neural network (DNN) can identify known objects. Examples of objects include buildings, doors, windows, roadways, etc.

At block 404, rectify the obtained images to remove distortion. Eyewear 200 may rectify the images to remove distortion introduced by the respective lenses of the cameras 202 (e.g., distortion at the edges of the lens resulting from vignetting; a reduction in brightness or saturation at the periphery compared to the image center) to facilitate comparison of features between images. The right raw image is rectified to create a right rectified image and the left raw image is rectified to create the right rectified image.

Figure 5:
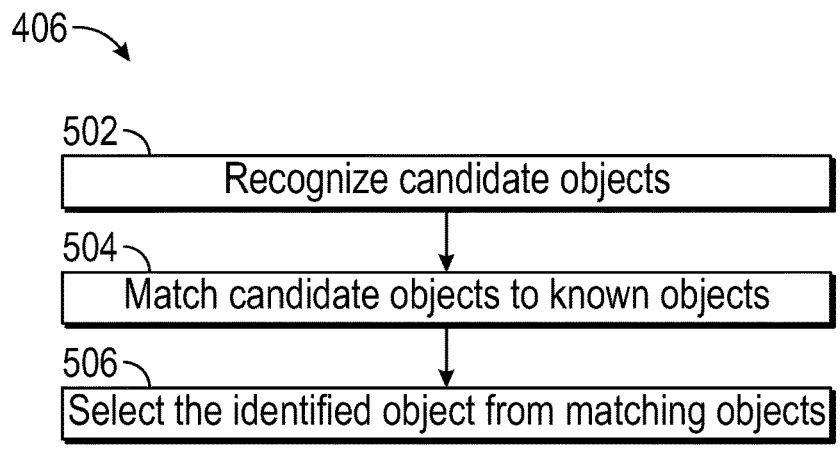
FIG. 5 is a flowchart of an example method for identifying the object in the method of FIG. 4.

At block 406, identify objects in the rectified images having linear features with known parallel relationships. The eyewear may identify objects using the method in FIG. 5. The eyewear first recognizes candidate objects (block 502). The eyewear may recognize candidate objects using object recognition software. The eyewear then matches the candidate objects to known objects (block 504). Known objects include, by way of non-limiting example, windows, doors, roof lines, roadways, sidewalks, etc. The eyewear may match candidate objects to known objects using object recognition software. The eyewear the selects one or more objects from the candidate objects with matches (block 506). The selection of objects may be based on an ordered list stored in a database. In one example, roof lines are given priority over window frames during selection. In another example, the selection includes both roof lines and window frames.

Figure 6:
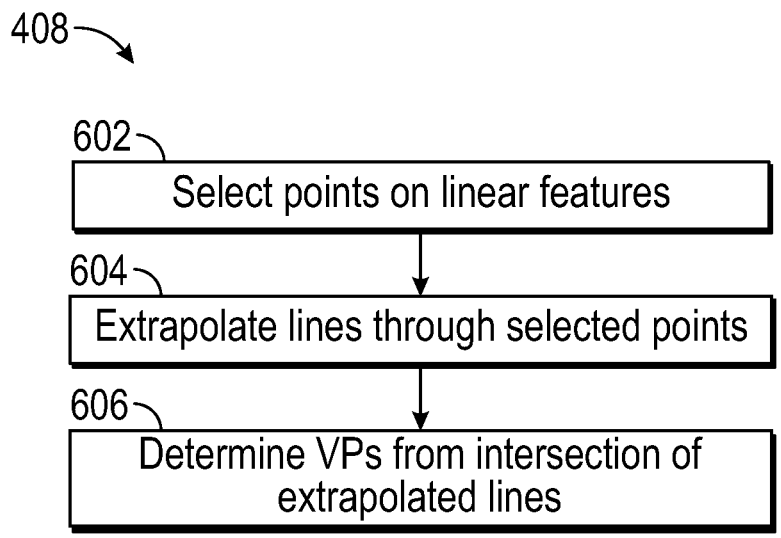
FIG. 6 is a flowchart of an example method for extending linear features in the method of FIG. 4.

At block 408, extend linear features to extrapolate vanishing points in each of the images. The eyewear may extrapolate vanishing points using the method in FIG. 6. The eyewear first selects points on the linear features (block 602). The eyewear selects at least two points on at least two linear features having a known parallel relationship. For example, with reference to FIG. 3C, the eyewear selected a first point 324*a* and a second point 324*b* on the apex 324 of the roof 316 and a third point 326*a* and a fourth point 326*b* on a lower edge 326 of the roof 316. The points may be selected at a one-third (⅓) and two-third (⅔) position of the overall length (actual or apparent) of the feature. The eyewear then extrapolates the points of each feature toward the background of the image, e.g., through linear extrapolations (block 604). For example, in each image, the eyewear may extrapolate a first line through the first and second points toward the background and may extrapolate a second line through the third and fourth points toward the background. The eyewear then determines the VP from the intersection of the first and second lines created through extrapolation (block 606). The intersection includes a point between the two lines (e.g., a midpoint) at their closes point if the lines to not contact each other at their closest point.

Figure 7:
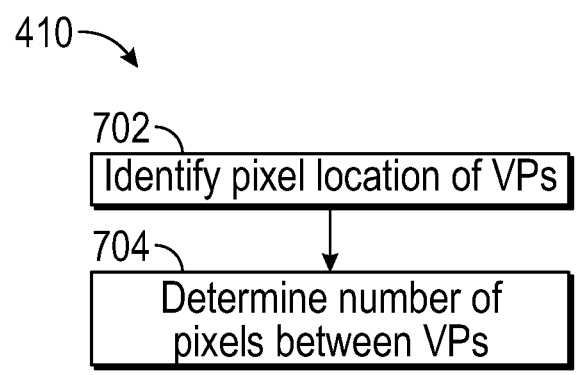
FIG. 7 is a flowchart of an example method for comparing vanishing points to obtain a calibration offset in the method of FIG. 4.

At block 410, compare the vanishing points to obtain a calibration offset. The eyewear may compare the vanishing points from each image to the other to determine the calibration offset using the method in FIG. 7. The eyewear identifies a first pixel location corresponding to the first VP in the first image and a second pixel location corresponding to the second VP in the second image (block 702). The eyewear then determines the number of pixels between the first and second VPs and identifies the difference as the calibration offset (block 704).

At block 412, adjust a three-dimensional rendering offset by the calibration offset. To determine the rendering offset, the eyewear identifies an offset between the stereoscopic images for one or more features in a known scene. A calibration algorithm may compare an offset for a known feature(s)/scene in an image (e.g., a left raw or rectified image) to that known feature(s)/scene in another image (e.g., a right raw or rectified image). In an example, the number of pixels between the position of the feature in the left image and the position of the feature in the right image (e.g., in a horizontal direction) is the rendering offset. The eyewear stores the three-dimensional rendering offset for use in displaying and/or rendering three-dimensional images. The eyewear adjusts the stored rendering offset obtained from the known scene by the calibration offset for images obtained in unknown environments (e.g., to accommodate flexure of the eyewear when worn).

At block 414, present the three-dimensional images using the adjusted rendering offset. In an example, a stereoscopic algorithm presents the right and left images of the stereoscopic images to the right and left eyes, respectively, of an observer (e.g., via displays of the eyewear) using the adjusted rendering offset. The presented images are projected, taking the adjusted offset into account, in order to provide a more realistic three-dimensional effect to the wearer. In another example, the stereoscopic algorithm concatenates the right and left images of the stereoscopic images on a display, taking the adjusted offset into account, in order provide a more realistic three-dimensional effect to the viewer.

The steps in FIGS. 4-7 may be performed by a controller of the eyewear and/or a controller of an electronic device coupled to the eyewear through execution of instructions stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller(s) described herein, such as the steps in FIGS. 4-7, may be implemented in software code or instructions that are tangibly stored on a tangible computer readable medium.

Figure 8:
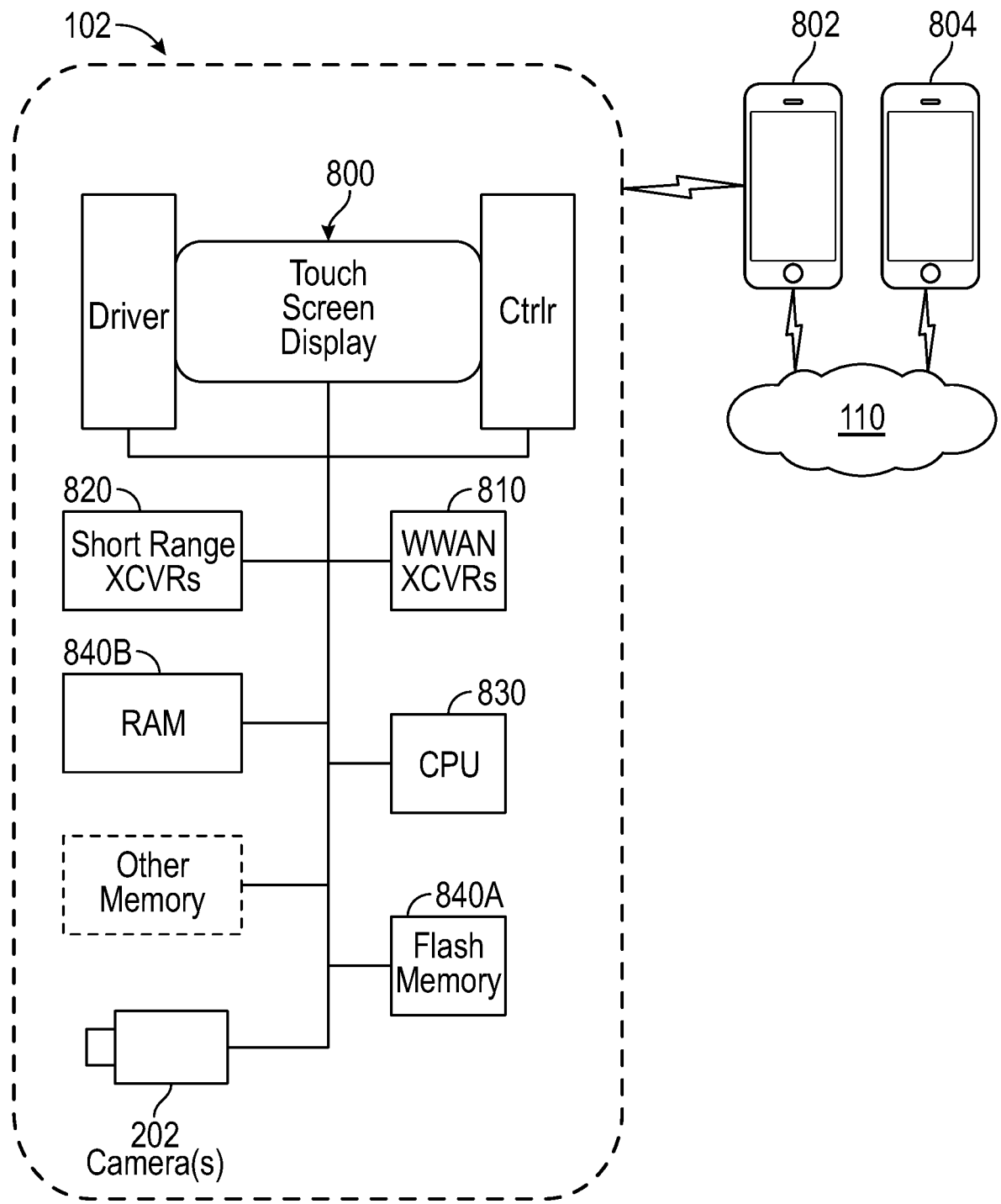
FIG. 8 is a high-level functional block diagram of an example client device including a mobile device that communicates via network with server system.
Figure 9:
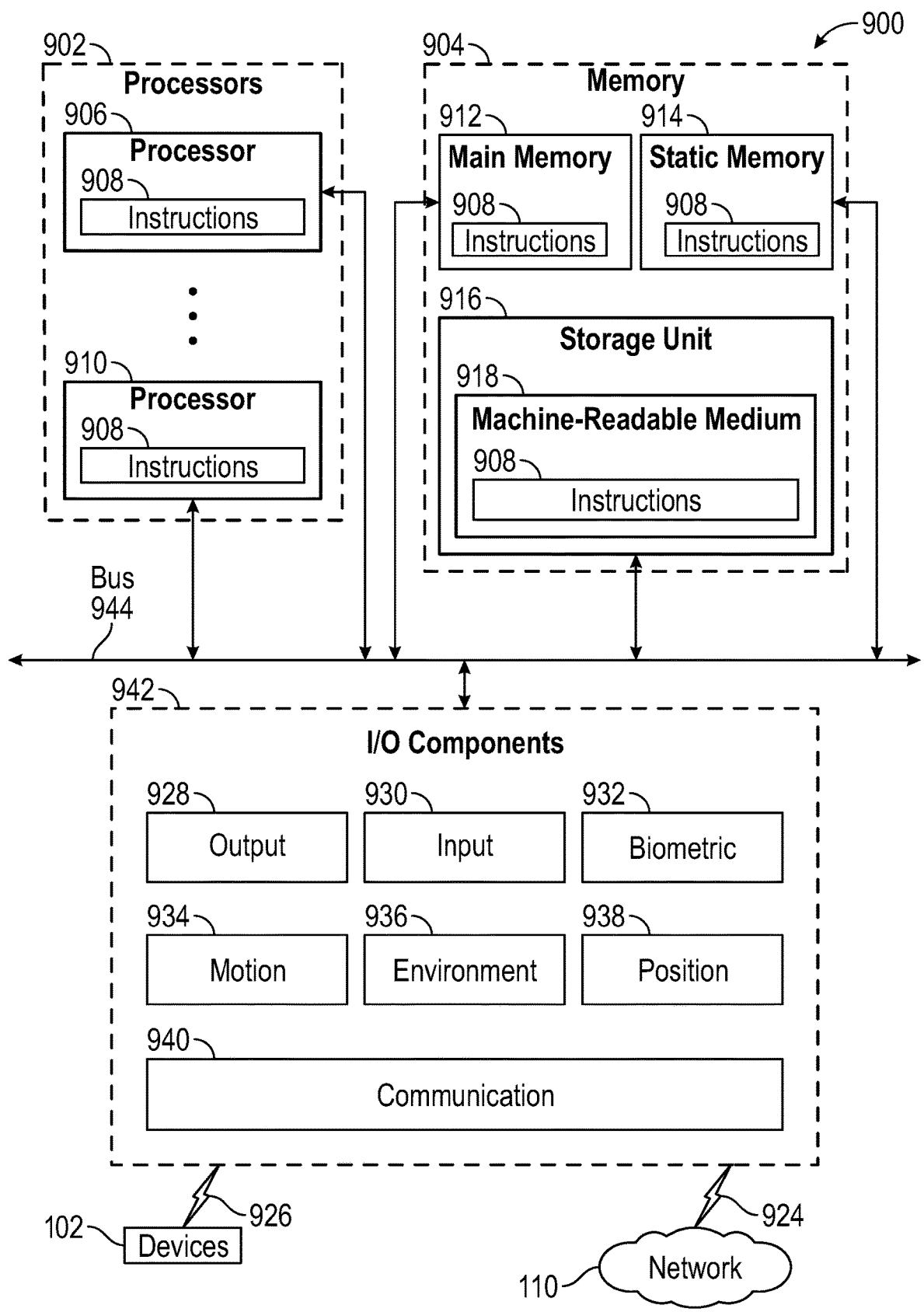
FIG. 9 is a diagrammatic representation of an example machine in the form of a computer system within which a set of instructions may be executed for causing the machine to perform any one or more of the methodologies discussed herein.

FIG. 8 is a high-level functional block diagram of an example client device 110 comprising a mobile device that communicates via network 102 with server system 120 of FIG. 9. The mobile device may be the eyewear 100 alone or in combination with another mobile device such as a cellular telephone with processing described herein shared between two or more devices. Other mobile devices may include a local mobile device 802 such as the users' cellular phone or a remote mobile device 804 connected via the network 110. Shown are elements of a touch screen type mobile device 800, although other non-touch type mobile devices can be used under consideration here. Examples of touch screen type mobile devices that may be used include (but are not limited to) a smart phone, a personal digital assistant (PDA), a tablet computer, a laptop computer, or other portable device. However, the structure and operation of the touch screen type devices is provided by way of example, and the subject technology as described herein is not intended to be limited thereto. For purposes of this discussion, FIG. 8 therefore provides a block diagram illustration of the example mobile device 110 having a touch screen display for displaying content and receiving user input as (or as part of) the user interface. Mobile device 890 also includes camera(s) 202, such as visible light cameras.

As shown in FIG. 8, the mobile device 110 includes at least one digital transceiver (XCVR) 810, shown as WWAN XCVRs, for digital wireless communications via a wide area wireless mobile communication network 102. The mobile device 110 also includes additional digital or analog transceivers, such as short range XCVRs 820 for short-range network communication, such as via NFC, VLC, DECT, ZigBee, Bluetooth™, or WiFi. For example, short range XCVRs 820 may take the form of any available two-way wireless local area network (WLAN) transceiver of a type that is compatible with one or more standard protocols of communication implemented in wireless local area networks, such as one of the Wi-Fi standards under IEEE 802.11 and 4G LTE.

To generate location coordinates for positioning of the mobile device 102, the mobile device 102 can include a global positioning system (GPS) receiver. Alternatively, or additionally the mobile device 102 can utilize either or both the short range XCVRs 820 and WWAN XCVRs 810 for generating location coordinates for positioning. For example, cellular network, WiFi, or Bluetooth™ based positioning systems can generate very accurate location coordinates, particularly when used in combination. Such location coordinates can be transmitted to the eyewear device over one or more network connections via XCVRs 820.

The transceivers 810, 820 (network communication interface) conforms to one or more of the various digital wireless communication standards utilized by modern mobile networks. Examples of WWAN transceivers 810 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, the transceivers 810, 820 provide two-way wireless communication of information including digitized audio signals, still image and video signals, web page information for display as well as web related inputs, and various types of mobile message communications to/from the mobile device 102 for user identification strategies.

Several of these types of communications through the transceivers 810, 820 and a network, as discussed previously, relate to protocols and procedures in support of communications with the server system 106. Such communications, for example, may transport packet data via the short range XCVRs 820 over the wireless connections of network 110 to and from the server system 106 as shown in FIG. 1. Such communications, for example, may also transport data utilizing IP packet data transport via the WWAN XCVRs 810 over the network (e.g., Internet) 110 shown in FIG. 1. Both WWAN XCVRs 810 and short range XCVRs 820 connect through radio frequency (RF) send-and-receive amplifiers (not shown) to an associated antenna (not shown).

The mobile device 102 further includes a microprocessor 830, shown as a CPU, sometimes referred to herein as the host controller. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The processor 830, for example, may be based on any known or available microprocessor architecture, such as a Reduced Instruction Set Computing (RISC) using an ARM architecture, as commonly used today in mobile devices and other portable electronic devices. Other processor circuitry may be used to form the CPU 830 or processor hardware in smartphone, laptop computer, and tablet.

The microprocessor 830 serves as a programmable host controller for the mobile device 102 by configuring the mobile device to perform various operations, for example, in accordance with instructions or programming executable by processor 830. For example, such operations may include various general operations of the mobile device, as well as operations related to performance metric monitoring, reporting to server system 106, and gating. Although a processor may be configured by use of hardwired logic, typical processors in mobile devices are general processing circuits configured by execution of programming.

The mobile device 102 includes a memory or storage device system, for storing data and programming. In the example, the memory system may include a flash memory 840A and a random access memory (RAM) 840B. The RAM 840B serves as short term storage for instructions and data being handled by the processor 830, e.g. as a working data processing memory. The flash memory 840A typically provides longer term storage.

Hence, in the example of mobile device 102, the flash memory 840A is used to store programming or instructions for execution by the processor 830. Depending on the type of device, the mobile device 102 stores and runs a mobile operating system through which specific applications, including application 104, are run. Applications may be a native application, a hybrid application, or a web application (e.g., a dynamic web page executed by a web browser) that runs on mobile device 102. Examples of mobile operating systems include Google Android®, Apple iOS® (I-Phone or iPad devices), Windows Mobile®, Amazon Fire OS®, RIM BlackBerry® operating system, or the like.

FIG. 9 is a diagrammatic representation of a machine 900 within which instructions 908 (e.g., software, a program, an application, an applet, an app, or other executable code) for causing the machine 900 to perform any one or more of the methodologies discussed herein may be executed. For example, the instructions 908 may cause the machine 900 to execute any one or more of the methods described herein. The instructions 908 transform the general, non-programmed machine 900 into a particular machine 900 programmed to carry out the described and illustrated functions in the manner described. The machine 900 may operate as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 908, sequentially or otherwise, that specify actions to be taken by the machine 900. Further, while only a single machine 900 is illustrated, the term "machine" shall also be taken to include a collection of machines that individually or jointly execute the instructions 908 to perform any one or more of the methodologies discussed herein.

The machine 900 may include processors 902, memory 904, and I/O components 942, which may be configured to communicate with each other via a bus 944. In an example, the processors 902 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 906 and a processor 910 that execute the instructions 908. The term "processor" is intended to include multi-core processors that may comprise two or more independent processors (sometimes referred to as "cores") that may execute instructions contemporaneously. Although FIG. 9 shows multiple processors 902, the machine 900 may include a single processor with a single core, a single processor with multiple cores (e.g., a multi-core processor), multiple processors with a single core, multiple processors with multiples cores, or any combination thereof.

The memory 904 includes a main memory 912, a static memory 914, and a storage unit 916, both accessible to the processors 902 via the bus 944. The main memory 904, the static memory 914, and storage unit 916 store the instructions 908 embodying any one or more of the methodologies or functions described herein. The instructions 908 may also reside, completely or partially, within the main memory 912, within the static memory 914, within machine-readable medium 918 (e.g., a non-transitory machine-readable storage medium) within the storage unit 916, within at least one of the processors 902 (e.g., within the processor's cache memory), or any suitable combination thereof, during execution thereof by the machine 900.

Furthermore, the machine-readable medium 918 is non-transitory (in other words, not having any transitory signals) in that it does not embody a propagating signal. However, labeling the machine-readable medium 918 "non-transitory" should not be construed to mean that the medium is incapable of movement; the medium should be considered as being transportable from one physical location to another. Additionally, since the machine-readable medium 918 is tangible, the medium may be a machine-readable device.

The I/O components 942 may include a wide variety of components to receive input, provide output, produce output, transmit information, exchange information, capture measurements, and so on. The specific I/O components 942 that are included in a particular machine will depend on the type of machine. For example, portable machines such as mobile phones may include a touch input device or other such input mechanisms, while a headless server machine will likely not include such a touch input device. It will be appreciated that the I/O components 942 may include many other components that are not shown in FIG. 9. In various examples, the I/O components 942 may include output components 928 and input components 930. The output components 928 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 930 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location, force of touches or touch gestures, or other tactile input components), audio input components (e.g., a microphone), and the like.

In further examples, the I/O components 942 may include biometric components 932, motion components 934, environmental components 936, or position components 938, among a wide array of other components. For example, the biometric components 932 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 934 include acceleration sensor components (e.g., accelerometer), gravitation sensor components, rotation sensor components (e.g., gyroscope), and so forth. The environmental components 936 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 938 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 942 further include communication components 940 operable to couple the machine 900 to network 102 and client devices 110 via a coupling 924 and a coupling 926, respectively. For example, the communication components 940 may include a network interface component or another suitable device to interface with the network 102. In further examples, the communication components 940 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 922 may be another machine or any of a wide variety of peripheral devices (e.g., a peripheral device coupled via a USB).

Moreover, the communication components 940 may detect identifiers or include components operable to detect identifiers. For example, the communication components 940 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940, such as location via Internet Protocol (IP) geolocation, location via Wi-Fi® signal triangulation, location via detecting an NFC beacon signal that may indicate a particular location, and so forth.

The various memories (e.g., memory 904, main memory 912, static memory 914, memory of the processors 902), storage unit 916 may store one or more sets of instructions and data structures (e.g., software) embodying or used by any one or more of the methodologies or functions described herein. These instructions (e.g., the instructions 908), when executed by processors 902, cause various operations to implement the disclosed examples.

The instructions 908 may be transmitted or received over the network 102, using a transmission medium, via a network interface device (e.g., a network interface component included in the communication components 940) and using any one of a number of well-known transfer protocols (e.g., hypertext transfer protocol (HTTP)). Similarly, the instructions 908 may be transmitted or received using a transmission medium via the coupling 926 (e.g., a peer-to-peer coupling) to the devices 922.

Figure 10:
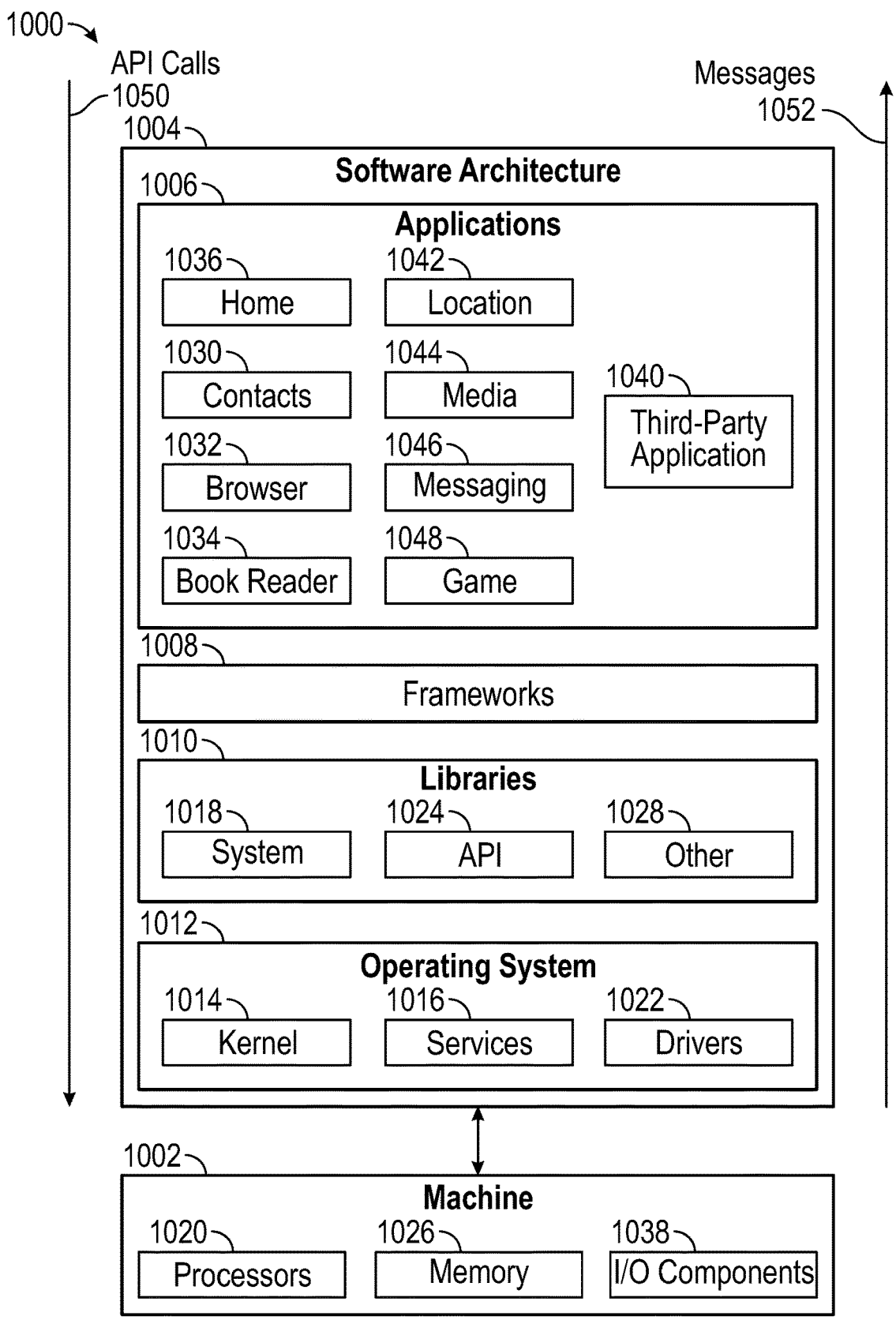
FIG. 10 is block diagram of an example software architecture within which the present disclosure may be implemented.

FIG. 10 is a block diagram 1000 illustrating a software architecture 1004, which can be installed on any one or more of the devices described herein. The software architecture 1004 is supported by hardware such as a machine 1002 that includes processors 1020, memory 1026, and I/O components 1038. In this example, the software architecture 1004 can be conceptualized as a stack of layers, where each layer provides a particular functionality. The software architecture 1004 includes layers such as an operating system 1012, libraries 1010, frameworks 1008, and applications 1006. Operationally, the applications 1006 invoke API calls 1050 through the software stack and receive messages 1052 in response to the API calls 1050.

The operating system 1012 manages hardware resources and provides common services. The operating system 1012 includes, for example, a kernel 1014, services 1016, and drivers 1022. The kernel 1014 acts as an abstraction layer between the hardware and the other software layers. For example, the kernel 1014 provides memory management, processor management (e.g., scheduling), component management, networking, and security settings, among other functionality. The services 1016 can provide other common services for the other software layers. The drivers 1022 are responsible for controlling or interfacing with the underlying hardware. For instance, the drivers 1022 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 1010 provide a low-level common infrastructure used by the applications 1006. The libraries 1010 can include system libraries 1018 (e.g., C standard library) that provide functions such as memory allocation functions, string manipulation functions, mathematic functions, and the like. In addition, the libraries 1010 can include API libraries 1024 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1010 can also include a wide variety of other libraries 1028 to provide many other APIs to the applications 1006.

The frameworks 1008 provide a high-level common infrastructure that is used by the applications 1006. For example, the frameworks 1008 provide various graphical user interface (GUI) functions, high-level resource management, and high-level location services. The frameworks 1008 can provide a broad spectrum of other APIs that can be used by the applications 1006, some of which may be specific to a particular operating system or platform.

In an example, the applications 1006 may include a home application 1036, a contacts application 1030, a browser application 1032, a book reader application 1034, a location application 1042, a media application 1044, a messaging application 1046, a game application 1048, and a broad assortment of other applications such as a third-party application 1040. The applications 1006 are programs that execute functions defined in the programs. Various programming languages can be employed to create one or more of the applications 1006, structured in a variety of manners, such as object-oriented programming languages (e.g., Objective-C, Java, or C++) or procedural programming languages (e.g., C or assembly language). In a specific example, the third-party application 1040 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1040 can invoke the API calls 1050 provided by the operating system 1012 to facilitate functionality described herein.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A system comprising:
an image capture device, including:
a support structure, and
a first camera and a second camera connected to the support structure, the first camera positioned to capture a first image and the second camera positioned to capture a second image;
a processor coupled to the image capture device;
a memory accessible to the processor; and
programming in the memory, wherein execution of the programming by the processor configures the system to perform functions, including functions to:
obtain the first image from the first camera and the second image from the second camera;
identify an object in the first and second images having a first linear feature and a second linear feature known to have a parallel relationship by recognizing candidate objects within at least one of the first or second images, matching the candidate objects to known objects having a known parallel relationship and that are prioritized, and selecting the matching candidate object having the highest priority as the identified object from the candidate objects matching the known objects;
extend the first and second linear features in each of the first and second images to extrapolate a first vanishing point (VP) for the first image and a second VP for the second image;
compare the first and second VPs to obtain a calibration offset;
adjust a three-dimensional rendering offset by the obtained calibration offset; and
present the first and second images as a three-dimensional image using the adjusted three-dimensional rendering offset.

2. The system of claim 1, wherein the calibration offset corrects for rotation of the first camera with respect to the second camera.

3. The system of claim 2, wherein the rotation of the first camera with respect to the second camera is due to flexure of the support structure.

4. The system of claim 1, wherein the function to extend the first and second linear features in each of the first and second images to extrapolate the first VP for the first image and the second VP for the second image includes functions to, for each of the first and second images:
select a first point on the first linear feature and a second point on the first linear feature spaced from the first point;
select a third point on the second linear feature and a fourth point on the second linear feature spaced from the third point;
extrapolate a first line through the first and second points and a second line through the third and fourth points; and
determine the first VP from the intersection of the first line and the second line for the first image and the second VP from the intersection of the first line and the second line for the second image.

5. The system of claim 1, wherein the function to compare the first and second VPs to obtain the calibration offset includes functions to:
identify a first pixel location corresponding to the first VP and a second pixel location corresponding to the second VP;
determine a number of pixel difference between the first VP and the second VP; and
set the number of pixel difference as the calibration offset.

6. The system of claim 1, wherein the support structure includes a frame and temples extending from the frame, the first and second cameras are supported by the frame, and the frame includes a rigid bar embedded therein for increasing the stiffness of the frame, and wherein the first and second cameras are positioned on the support structure of the image capture device a predetermined distance apart to capture stereoscopic images from different fields of view.

7. The system of claim 6, wherein the programming in the memory for presenting images includes concatenating the stereoscopic images using the adjusted three-dimensional rendering offset.

8. A calibration method for a stereoscopic image capture system having a first camera and a second camera, the method comprising the steps of:
obtaining a first image from the first camera and a second image from the second camera;
identifying an object in the first and second images having a first linear feature and a second linear feature known to have a parallel relationship by recognizing candidate objects within at least one of the first or second images, matching the candidate objects to known objects having a known parallel relationship and that are prioritized, and selecting the matching candidate object having the highest priority as the identified object from candidate objects matching the known objects;
extending the first and second linear features in each of the first and second images to extrapolate a first vanishing point (VP) for the first image and a second VP for the second image;
comparing the first and second VPs to obtain a calibration offset;
adjusting a three-dimensional rendering offset by the obtained calibration offset; and
presenting the first and second images as a three-dimensional image using the adjusted three-dimensional rendering offset.

9. The method of claim 8, wherein the presenting step comprises:
presenting the three-dimensional image on a display.

10. The method of claim 9, further comprising:
concatenating the stereoscopic images using the adjusted offset to create the three-dimensional image for presentation on the display.

11. The method of claim 8, wherein the image capture system includes a first display and a second display and wherein the presenting step comprises:
presenting a left image component of the three-dimensional image on the first display and a right image component of the three-dimensional image on the second display.

12. The method of claim 8, wherein the extending the first and second linear features includes, for each of the first and second images:
   selecting a first point on the first linear feature and a second point on the first linear feature spaced from the first point;
   selecting a third point on the second linear feature and a fourth point on the second linear feature spaced from the third point;
   extrapolating a first line through the first and second points and a second line through the third and fourth points; and
   determining the first VP from the intersection of the first line and the second line for the first image and the second VP from the intersection of the first line and the second line for the second image.

13. The method of claim 8, wherein the comparing includes:
   identifying a first pixel location corresponding to the first VP and a second pixel location corresponding to the second VP;
   determining a number of pixel difference between the first VP and the second VP; and
   setting the number of pixel difference as the calibration offset.

14. The method of claim 8, further comprising:
   rectifying the stereoscopic images to correct for distortion in the stereoscopic images.

15. A non-transitory processor-readable storage medium storing processor-executable instructions for calibrating a stereoscopic image capture system including a first camera and a second camera, that, when executed by a processor of a machine, cause the machine to perform operations comprising:
   obtaining a first image from the first camera and a second image from the second camera;
   identifying an object in the first and second images having a first linear feature and a second linear feature known to have a parallel relationship by recognizing candidate objects within at least one of the first or second images, matching the candidate objects to known objects having a known parallel relationship and that are prioritized, and selecting the matching candidate object having the highest priority as the identified object from the candidate objects matching the known objects;
   extending the first and second linear features in each of the first and second images to extrapolate a first vanishing point (VP) for the first image and a second VP for the second image;
   comparing the first and second VPs to obtain a calibration offset;
   adjusting a three-dimensional rendering offset by the obtained calibration offset; and
   presenting the first and second images as a three-dimensional image using the adjusted three-dimensional rendering offset.

16. The non-transitory processor-readable storage medium of claim 15, wherein to extend the first and second linear features the stored instructions further cause the machine to perform operations comprising:
   selecting a first point on the first linear feature and a second point on the first linear feature spaced from the first point;
   selecting a third point on the second linear feature and a fourth point on the second linear feature spaced from the third point;
   extrapolating a first line through the first and second points and a second line through the third and fourth points; and
   determining the first VP from the intersection of the first line and the second line for the first image and the second VP from the intersection of the first line and the second line for the second image.

17. The non-transitory processor-readable storage medium of claim 15, wherein to compare the first and second VPs the stored instructions further cause the machine to perform operations comprising:
   identifying a first pixel location corresponding to the first VP and a second pixel location corresponding to the second VP;
   determining a number of pixel difference between the first VP and the second VP; and
   setting the number of pixel difference as the calibration offset.

* * * * *